(12) United States Patent
Blatchley

(10) Patent No.: US 11,137,195 B2
(45) Date of Patent: Oct. 5, 2021

(54) DE-ICING CONTROL IN A VEHICLE HEAT PUMP SYSTEM

(71) Applicant: Ford Global Technologies, LLC, Dearborn, MI (US)

(72) Inventor: Timothy Blatchley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 75 days.

(21) Appl. No.: 16/294,583

(22) Filed: Mar. 6, 2019

(65) Prior Publication Data

US 2020/0284497 A1  Sep. 10, 2020

(51) Int. Cl.
| | |
|---|---|
| *F25D 21/12* | (2006.01) |
| *F25B 49/02* | (2006.01) |
| *F25B 30/02* | (2006.01) |
| *F25B 47/02* | (2006.01) |

(52) U.S. Cl.
CPC .............. *F25D 21/12* (2013.01); *F25B 30/02* (2013.01); *F25B 47/022* (2013.01); *F25B 49/025* (2013.01); *F25B 2347/021* (2013.01); *F25B 2700/2106* (2013.01)

(58) Field of Classification Search
CPC ........ F25D 21/12; F25B 30/02; F25B 47/022; F25B 49/025; F25B 2347/021; F25B 2700/2106; B60H 1/32284
See application file for complete search history.

(56) References Cited

U.S. PATENT DOCUMENTS

| | | | |
|---|---|---|---|
| 5,664,429 A | 9/1997 | Isaji | |
| 6,725,679 B2 | 4/2004 | Itoh et al. | |
| 7,004,246 B2 | 2/2006 | Gavula | |
| 2010/0022957 A1 | 1/2010 | Sauer et al. | |
| 2015/0233627 A1 | 8/2015 | Ragazzi | |
| 2015/0308719 A1 | 10/2015 | Gebbie et al. | |
| 2016/0209099 A1 | 7/2016 | Liu et al. | |
| 2016/0332504 A1 | 11/2016 | Blatchley et al. | |
| 2016/0339761 A1* | 11/2016 | Enomoto | ........... B60H 1/00278 |
| 2017/0074153 A1* | 3/2017 | Kaneko | ................... F01P 7/165 |

FOREIGN PATENT DOCUMENTS

DE   102016208429 A1   11/2016

* cited by examiner

*Primary Examiner* — Marc E Norman
*Assistant Examiner* — Schyler S Sanks
(74) *Attorney, Agent, or Firm* — David Kelley; McCoy Russell LLP

(57) ABSTRACT

Methods and systems are provided for operating a dual loop heat pump system in a de-icing mode which enables the heat pump system to maintain a target rate of heat delivery to a cabin while de-icing an outside heat exchanger by leveraging waste-heat available at one or more waste-heat sources. In one example, responsive to an outside heat exchanger de-icing request and a cabin heating request, selecting a first waste-heat heat exchanger based on a temperature of the first waste-heat heat exchanger exceeding a first temperature threshold, flowing coolant to the first waste-heat heat exchanger, flowing a first portion of the coolant exiting the first waste-heat heat exchanger to a cabin heat exchanger, and flowing a second portion of the coolant exiting the first waste-heat heat exchanger to an outside heat exchanger.

5 Claims, 6 Drawing Sheets

DE-ICING CONTROL IN A VEHICLE HEAT PUMP SYSTEM

FIELD

The present description relates generally to a heat pump system and to a method for controlling the heat pump system in a de-icing mode.

BACKGROUND/SUMMARY

Heat pumps can reduce the energy used to heat a conditioned space, such as a vehicle cabin, by operating more efficiently than electric heaters under most use cases. However, heat pumps may accumulate moisture (through condensation, rain, etc.) on the outside heat exchanger which may freeze if the outside heat exchanger is operating at an evaporation temperature below freezing. The accumulation of ice/frost on the outside heat exchanger, a process referred to as ice fouling, may degrade the heat transfer performance of the outside heat exchanger by increasing the resistance to heat transfer between the outside heat exchanger and ambient air. This can also occur when it is snowing or freezing and rain and snow/ice accumulates on the outside heat exchanger. Ice fouling of the outside heat exchanger may degrade heat transfer between the ambient air and the outside heat exchanger such that the heat pump system performance may be degraded which will reduce the heating capacity of the conditioned space or result in the heat pump system shutting down, which may result in decreased passenger comfort as the heat pump system may no longer transfer sufficient heat to satisfy a cabin heating request.

One approach for mitigating ice fouling of the outside heat exchanger, shown by Liu et al. in U.S. 2016/0209099, teaches adjusting output of a compressor from a first speed to a second speed sufficient to generate an amount of heat in a refrigerant flowing through the heat exchanger to melt the accumulated ice, and may further include outputting a control signal to activate a climate control system to modify climate conditions of a cabin of the vehicle to a predetermined state. As an example, the approach taught by Liu et al. may increase a speed of compressor output from a first, lower level, to a second, higher level, in response to an indication that the outside heat exchanger is fouled by ice, undergoing ice fouling, or is likely to accumulate ice. By increasing a compressor output, a temperature of a refrigerant flowing to the outside heat exchanger may be increased due to the increased work performed by the compressor. The approach of Liu et al. further includes transitioning out of the de-icing mode based on performance attributes of the climate control system indicating the climate conditions of the vehicle cabin are not within a predetermined comfort range for passengers.

However, the inventors herein have recognized potential issues with such an approach. In one example, the approach of Liu requires increased power consumption to operate in the de-icing mode, as the energy used to increase the compressor output speed, and to maintain the increased compressor output speed may be provided by a battery, a motor, and/or an engine, and may therefore consume a vehicle's energy stores and decrease a vehicle's energy/fuel efficiency, thereby resulting in more frequent refueling/recharging and potentially higher emissions. As another example, the vapor compression heat pump system of Liu couples heat delivery to a heater core with the heat delivery to the outside heat exchanger, thus, increasing heat delivery to the outside heat exchanger during de-icing also increases heat delivery to the heater core, which may cause excessive heating of a passenger cabin in the absence of additional mitigating actions. Additionally, by de-icing an outside heat exchanger by increasing a compressor output speed, the compressor may mechanically wear at a higher rate, which may reduce a compressor lifespan and/or increase a probability of compressor failure.

In one example, the issues described above may be addressed by a method comprising generating an outside heat exchanger de-icing request, generating a cabin heating request, responsive to the outside heat exchanger de-icing request and the cabin heating request selecting a first waste-heat heat exchanger based on a temperature of the first waste-heat heat exchanger exceeding a first temperature threshold, flowing coolant in a first coolant loop through the first waste-heat heat exchanger, flowing the coolant in the first coolant loop through an evaporator heat exchanger, wherein the evaporator heat exchanger is thermally coupled to a gas cooler heat exchanger by a refrigerant loop, flowing a first portion of coolant in a second coolant loop exiting the gas cooler heat exchanger through a cabin heat exchanger, and flowing a second portion of coolant in the second coolant loop exiting the gas cooler heat exchanger through an outside heat exchanger. In this way, an outside heat exchanger may be de-iced using vehicle waste heat, while cabin heating is maintained, without reducing a vehicle's energy efficiency or impairing passenger comfort.

As an example, a vehicle may comprise one or more waste-heat heat exchangers for thermal management of various vehicle waste-heat sources. As a non-limiting example, waste-heat sources may include an engine, a motor, a battery, an inverter, vehicle brakes, an exhaust conduit, an alternator, a transmission, and other vehicle components which may generate excess waste heat during vehicle operation, charging, or during other operations. The waste-heat heat exchangers may be thermally coupled to waste-heat sources, enabling heat transfer between the waste-heat source and the waste-heat heat exchanger. Waste-heat heat exchangers may be used to transfer heat away from waste-heat sources based on a control scheme, to maintain waste-heat sources within a pre-determined range of operating temperatures. The inventors herein have recognized that by selecting a first waste-heat heat exchanger based on a temperature of the first waste-heat heat exchanger exceeding a first temperature threshold, and by flowing coolant through the selected waste-heat heat exchanger to both the outside heat exchanger and a cabin heat exchanger, waste heat may be used to de-ice the outside heat exchanger while meeting a cabin heating request, without relying on a compressor to generate additional heat, or disrupting cabin heating. This may increase a vehicle's energy efficiency compared to conventional approaches by leveraging waste-heat to de-ice an outside heat exchanger, as opposed to utilizing electric resistive heaters or heat supplied by a compressor operated at an elevated speed. The current disclosure may further enable a reduction in mechanical wear on the compressor as compared to the approach of Liu, which may increase a lifespan of the compressor.

As another example, by flowing a first portion of coolant in a second coolant loop exiting the gas cooler heat exchanger through a cabin heat exchanger, and flowing a second portion of coolant in the second coolant loop exiting the gas cooler heat exchanger through an outside heat exchanger, waste-heat available at the selected waste-heat heat exchanger may be efficiently apportioned between a vehicle cabin and the outside heat exchanger based on the outside heat exchanger de-icing request and the cabin heating request. In this way, heat delivered to the outside heat exchanger for de-icing, and heat delivered to a vehicle cabin to satisfy a cabin heating request, may be independently controlled, which is not taught in the approach of Liu et al.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to methods and systems for efficiently de-icing an outside heat exchanger of a heat pump system while maintaining a target rate of heat delivery to a vehicle cabin by leveraging waste heat available at one or more waste heat sources of a vehicle. In one example, the current disclosure provides a method comprising generating an outside heat exchanger de-icing request, generating a cabin heating request, responsive to the outside heat exchanger de-icing request and the cabin heating request selecting a first waste-heat heat exchanger based on a temperature of the first waste-heat heat exchanger exceeding a first temperature threshold, flowing coolant in a first coolant loop through the first waste-heat heat exchanger, flowing the coolant in the first coolant loop through an evaporator heat exchanger, wherein the evaporator heat exchanger is thermally coupled to a gas cooler heat exchanger by a refrigerant loop, flowing a first portion of coolant in a second coolant loop exiting the gas cooler heat exchanger through a cabin heat exchanger, and flowing a second portion of coolant in the second coolant loop exiting the gas cooler heat exchanger through an outside heat exchanger. By utilizing waste heat available at one or more waste heat sources, and apportioning this heat based on the de-icing request and the cabin heating request, heat may be efficiently delivered to both a vehicle cabin and an outside heat exchanger, thus enabling a target rate of heat delivery to the vehicle cabin while an outside heat exchanger is de-iced. The current disclosure bypasses the need to expend additional energy provided by a compressor, an engine, a motor, or other components, such as electric resistive heaters, and therefore may reduce energy consumption/wear of said components, while increasing an overall vehicle energy efficiency and maintaining an outside heat exchanger in a de-iced condition.

As used herein, the term outside heat exchanger may refer to a heat exchanger which transfers heat between a coolant/refrigerant loop of a vehicle heat transfer system, and ambient air, and as such, may be prone to accumulation of condensation/ice under some conditions. Although the following detailed description discusses heat pump systems comprising one outside heat exchanger, it will be appreciated that the current disclosure provides for a plurality of outside heat exchangers. In one example, an outside heat exchanger may comprise a radiator. Further, the terms heat exchanger and HEX may be used interchangeably.

Although the term coolant is used in the description of the systems and methods herein discussed, it will be appreciated that the current disclosure is compatible with refrigerant, or other heat exchange fluids, and where use of the term coolant occurs, the term refrigerant and/or heat exchange fluid may be used interchangeably.

Figure 1:
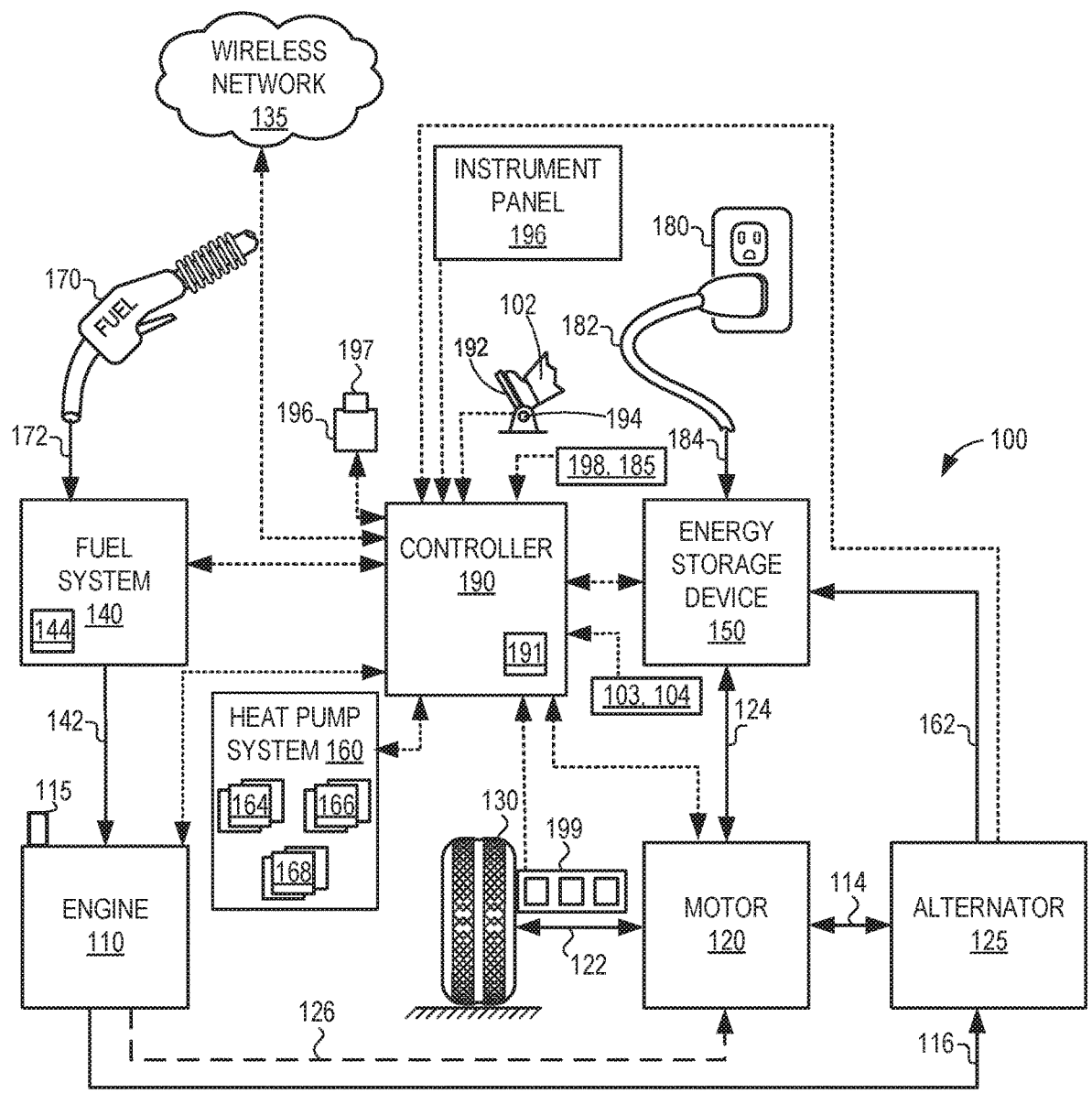
FIG. 1 schematically shows an example vehicle propulsion system according to embodiments of the current disclosure.
Figure 2A:
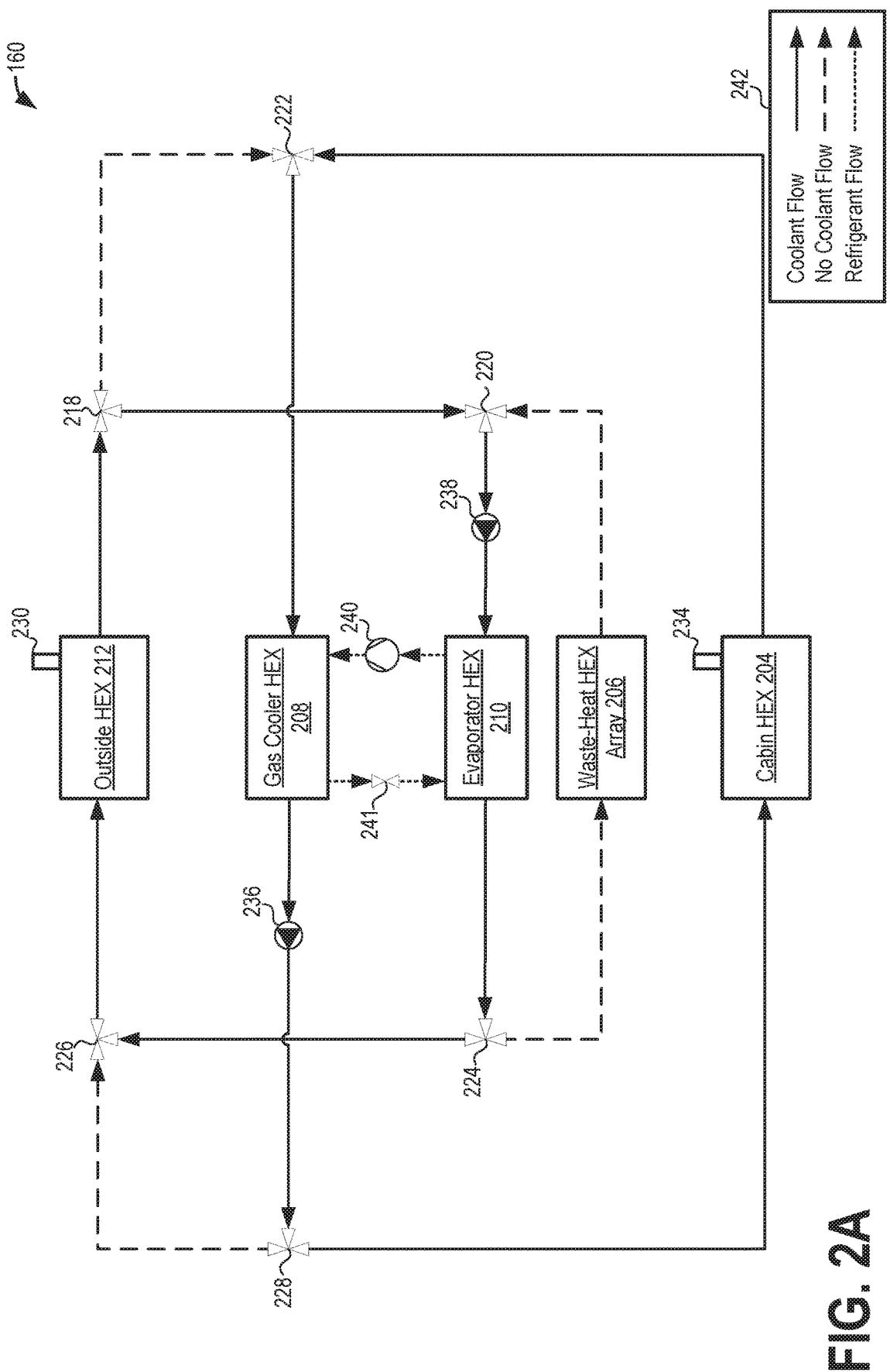
FIG. 2A schematically shows an example vehicle heat pump system operating in a cabin heating mode.
Figure 2B:
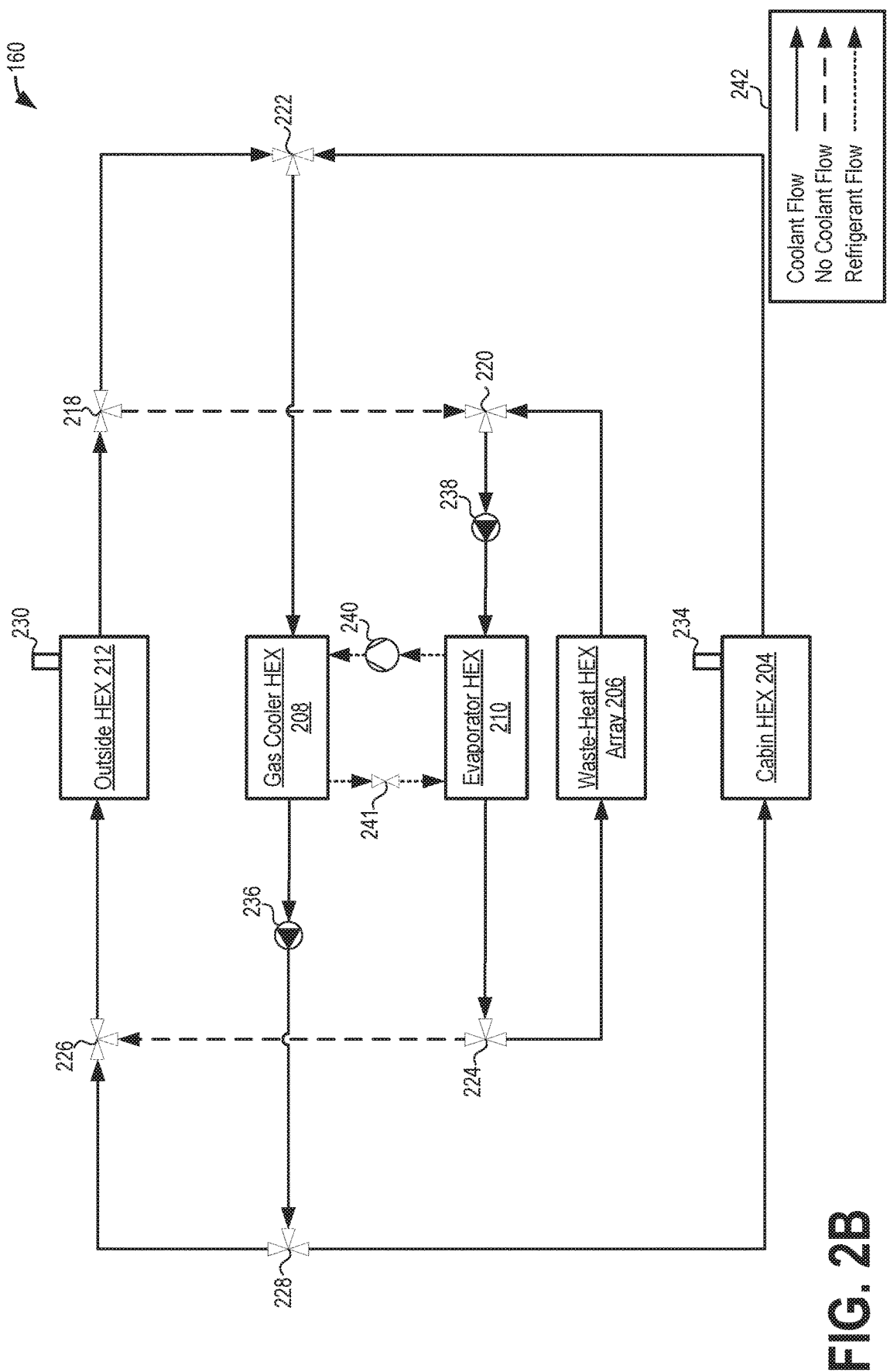
FIG. 2B schematically shows an example vehicle heat pump system operating in a de-icing mode according to embodiments of the current disclosure.
Figure 3:
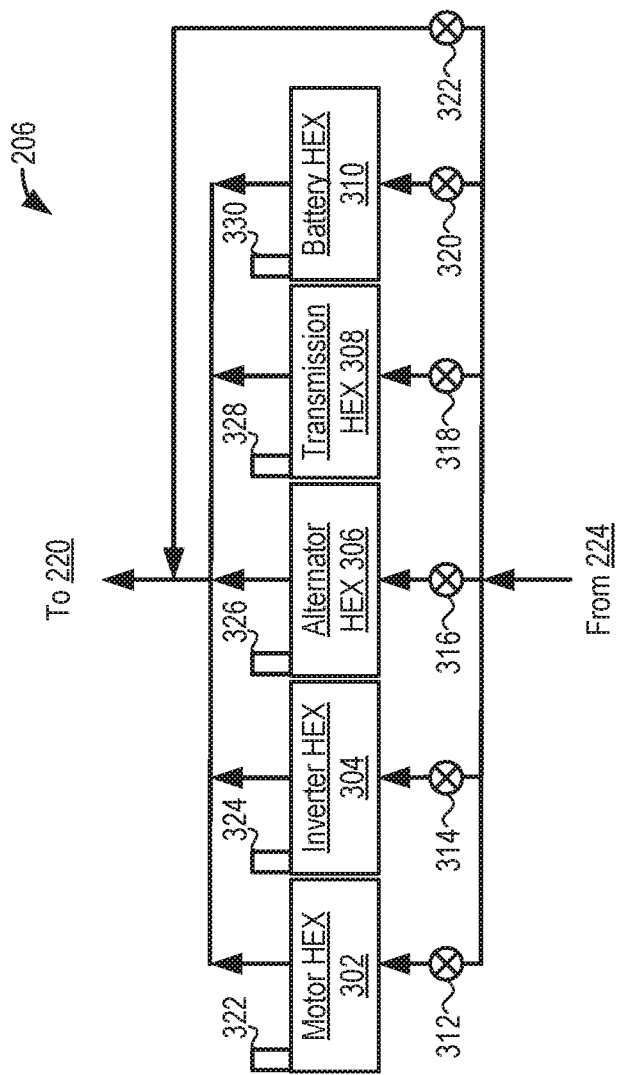
FIG. 3 schematically shows an example of a waste-heat heat exchanger array according to embodiments of the current disclosure.

FIG. 1 illustrates an example vehicle propulsion system comprising a heat pump system 160, which may conduct de-icing methods according to embodiments of the current disclosure. FIGS. 2A and 2B show example heat pump system 160 in more detail, in particular, FIG. 2A illustrates heat pump system 160 operating in a cabin heating mode, while FIG. 2B illustrates heat pump system 160 operating in a de-icing mode which also provides a target rate of heat delivery to a vehicle cabin by utilizing waste heat. FIG. 3 shows an example of an array of waste-heat heat exchangers, which may be thermally coupled to waste-heat sources and which may provide waste-heat for use in a de-icing method, such as example method 400 shown in FIG. 4. Method 400 may enable passenger comfort to be maintained while an outside heat exchanger is de-iced, by utilizing waste-heat, and allocating the waste heat to both the vehicle cabin and the outside heat exchanger such that a target rate of heat delivery to the vehicle cabin is maintained. FIG. 5 illustrates a prophetic example of how an amount of coolant directed towards an outside heat exchanger and an amount of coolant directed to a cabin heat exchanger may be controlled in a dual loop heat pump system according to methods of the current disclosure (such as method 400), to provide a target rate of cabin heat delivery and a target rate of de-icing.

FIG. 1 illustrates an example vehicle propulsion system 100. Vehicle propulsion system 100 includes a motor 120 and a fuel burning engine 110. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. A vehicle with propulsion system 100, which includes a motor and engine for propulsion, may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode). During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, alternator 125 may instead receive wheel torque from drive wheel 130, where the alternator may convert the kinetic energy of the vehicle to electrical energy for storage at energy storage device 150 as indicated by arrow 162.

Vehicle propulsion system 100 may be configured as a series type hybrid electric vehicle propulsion system, whereby the engine is not directly coupled to a drive wheel of the vehicle and does not directly provide torque for vehicle propulsion. Rather, engine 110 may be operated to provide supplemental power to motor 120, which may in turn propel the vehicle via drive wheel 130 as indicated by arrow 122. For example, during select operating conditions, engine 110 may drive alternator 125 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide an alternator function to convert the engine output to electrical energy, where the electrical energy may be stored at energy storage device 150 for later use by the motor. As the engine 110 may be operated to provide supplemental power for vehicle propulsion, in some control schemes the engine 110 may be operated intermittently during a single drive cycle.

Alternatively, vehicle propulsion system 100 may be configured as a parallel type hybrid electric vehicle propulsion system, whereby the engine 110 and motor 120 may both provide torque to wheel 130, either independently, or in concert. For example, engine 110 may mechanically couple to motor 120, as indicated by arrow 126, to provide torque to motor 120, and therethrough provide torque to wheel 130. In the previous example, both the engine 110 and motor 120 may provide torque to wheel 130, or alternatively, the engine 110 may alone provide torque to wheel 130. In another example, during select operating conditions, engine 110 may provide torque to wheel 130 via motor 120, while motor 120 is operated as a generator. In another example, during select operating conditions, engine 110 may provide torque to wheel 130 via motor 120, while motor 120 also provides torque to wheel 130, such that the torque acting on wheel 130 is the sum of the torques produced by motor 120 and engine 110, thereby both motor 120 and engine 110 provide torque in concert to wheel 130 to propel the vehicle. As the engine 110 may be operated to provide supplemental power for vehicle propulsion, in some control schemes the engine 110 may be operated intermittently during a single drive cycle.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to range extender engine 110, where they may be combusted at the engine to produce an engine output. The engine output may be utilized to generate electricity by operating alternator 125, said electricity used to directly power motor 120, or to recharge energy storage device 150.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, heat pump system 160, and alternator 125. Control system 190 may receive sensory feedback information from one or more of engine 110, motor 120, fuel system 140, energy storage device 150, heat pump system 160, and alternator 125. Further, control system 190 may send control signals to one or more of engine 110, motor 120, fuel system 140, energy storage device 150, heat pump system 160, and alternator 125 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle propulsion system 100 may also include ambient temperature sensor 198, humidity sensor 185, and engine temperature sensor 115. In one example, engine temperature sensor 115 is an engine coolant temperature (ECT) sensor wherein the engine temperature is inferred/estimated from the engine coolant temperature. In another example, engine temperature sensor 115 is a cylinder head temperature (CHT) sensor wherein the engine temperature is inferred from the cylinder head temperature. Controller 190 may be configured to communicate with wireless network 135, which may comprise a local area network, or a global computer network such as the internet. Controller 190 may obtain local weather/ambient condition data from connection to wireless network 135, which may include local pressure, temperature, humidity, and other forecast details.

Further, vehicle propulsion system 100 may include a heat pump system 160 for temperature control of vehicle components and for providing cabin climate control. Heat pump system 160 may comprise, a plurality of sensors, actuators, and heat exchangers. In particular, heat pump system 160, as shown in FIG. 1, comprises a plurality of temperature sensors 164, a plurality of valve actuators 166, and a plurality of heat exchangers 168. Coolant may flow throughout the plurality of heat exchangers 168 of heat pump system 160, wherein control over the flow path/direction/rate of the coolant through one or more or all of the plurality of heat exchangers 168 may be carried out by controller 190 based on instructions stored in memory therein via the plurality of valve actuators 166 based on the data transmitted to controller 190 from the plurality of temperature sensors 164. In one example, heat pump system 160 may comprise a dual loop heat pump system, wherein two fluidically uncoupled/closed loops are maintained by the position of the plurality of valve actuators 166, such that a first coolant loop may comprise coolant at a first average temperature, and a second coolant loop may comprise coolant at a second average temperature, wherein the first temperature and the second temperature are not equal The plurality of heat exchangers 168 may comprise an outside heat exchanger, for transferring heat between coolant and ambient air. In one particular example, during a cabin heating mode, an outside heat exchanger may receive coolant at a lower temperature than the ambient air, and may facilitate heat transfer from the ambient air into the coolant. The heat absorbed by the coolant from the ambient air may then be transferred to a cabin heat exchanger to provide heat to a vehicle cabin in order to satisfy a cabin heating request, thereby providing passengers with a comfortable climate. In cabin heating, such as described in the previous example, moisture may condense and freeze onto the outside heat exchanger, as the outside heat exchanger may be at a lower temperature than the ambient air. Accumulation of ice/frost on the outside heat exchanger is a recognized issue with outside heat exchangers, and the accumulation of ice/frost in this manner (herein also referred to as ice fouling) may degrade the heat transfer properties of the outside heat exchanger, by acting as a thermal resistance to the transfer of heat between the ambient air and the coolant within the outside heat exchanger, an issue which the current disclosure is directed towards mitigating.

The plurality of heat exchangers 168 may further comprise one or more heat exchangers thermally coupled to one or more waste-heat sources. For example, during electric motor propulsion, a vehicle motor, such as motor 120, may generate excess heat. Excess heat (herein used synonymously with waste-heat) generated by the motor may be transferred to a waste-heat heat exchanger, which may both provide heat for use within the heat pump system 160 (such as for de-icing of an outside heat exchanger, or to satisfy a cabin heating request), in addition to maintaining the motor 120 within a desired and pre-determined range of operating temperatures. In another example, waste-heat sources may include a battery, an engine, an exhaust conduit, brakes, transmission, engine oil, vehicle lights, an inverter, an alternator. Additionally, heat pump system 160 may further comprise a phase changing heat storage device, which may use act as a reservoir for accumulating waste-heat using a phase changing material, wherein the phase changing material may store thermal energy via the enthalpy change associated with a phase transition for later use.

Flow of coolant through each heat exchanger of the plurality of heat exchangers 168 may be controlled by controller 190 through actuation of one or more of the plurality of valve actuators 166. In one example, a valve actuator of the plurality of valve actuators 166 may be positioned upstream of a waste-heat heat exchanger, and may be configured to control the position of a valve based on the temperature of the waste-heat heat exchanger, wherein a flow of coolant to the waste-heat heat exchanger may be controlled by a valve position, wherein the valve position is controlled by the valve actuator, and the valve actuator is in turn controlled by controller 190 via signals transmitted from controller 190 to the valve actuator. In the previous example, the valve actuator may be an electromagnetic actuator, which may control a valve position based on a voltage and/or current received from controller 190. In one example, a valve actuator may entirely prevent flow of coolant through a waste-heat source. In another example, a valve may enable a variable amount of coolant flow through a heat exchanger, such as when the valve actuator is configured to adjust position of a continuously variable valve, such that a flowrate of coolant through the valve may be proportional to a degree of opening of the continuously variable valve.

Figure 4:
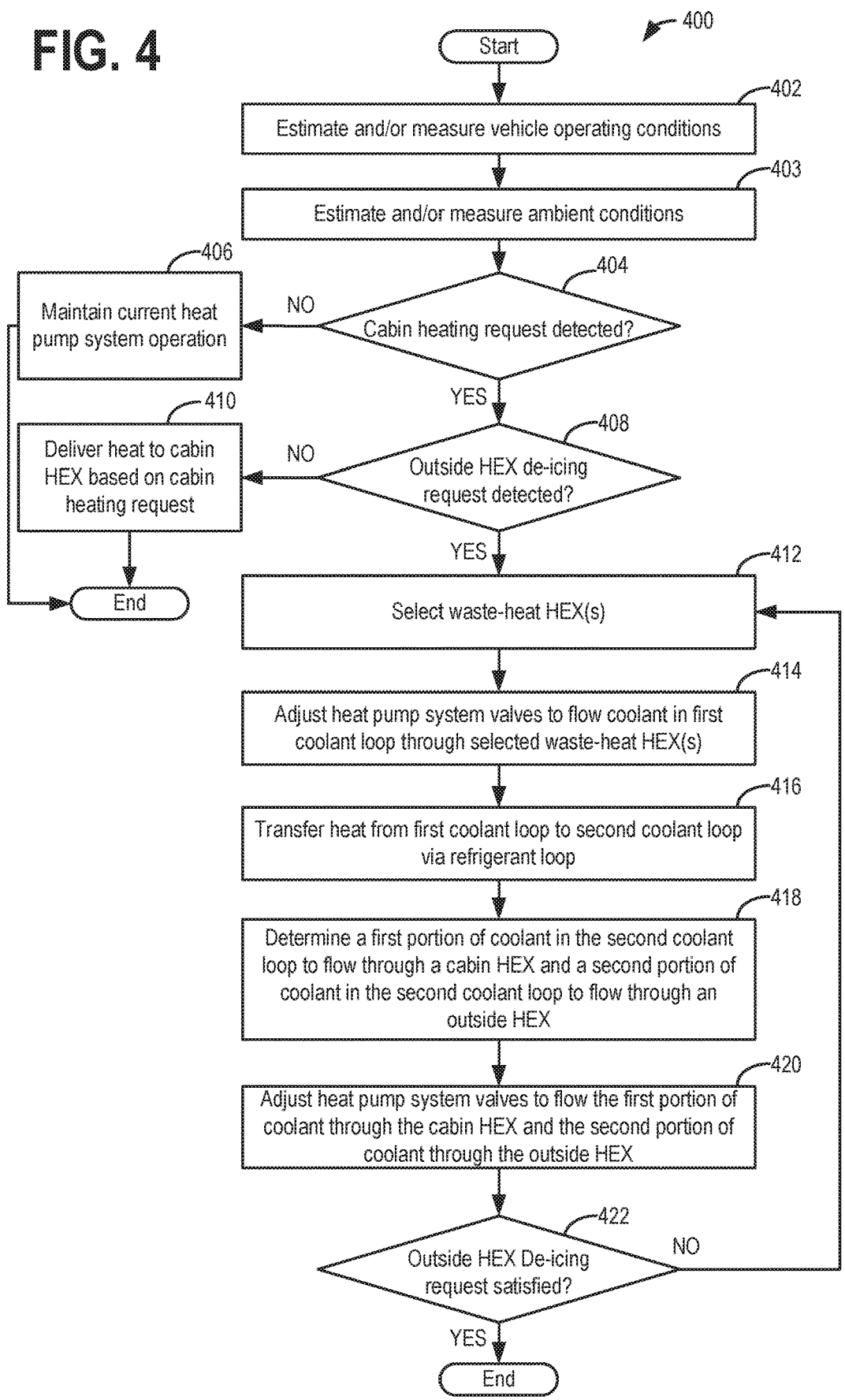
FIG. 4 depicts a high level flowchart for an example method of de-icing an outside heat exchanger while delivering heat to a vehicle cabin according to embodiments of the current disclosure.
Figure 5:
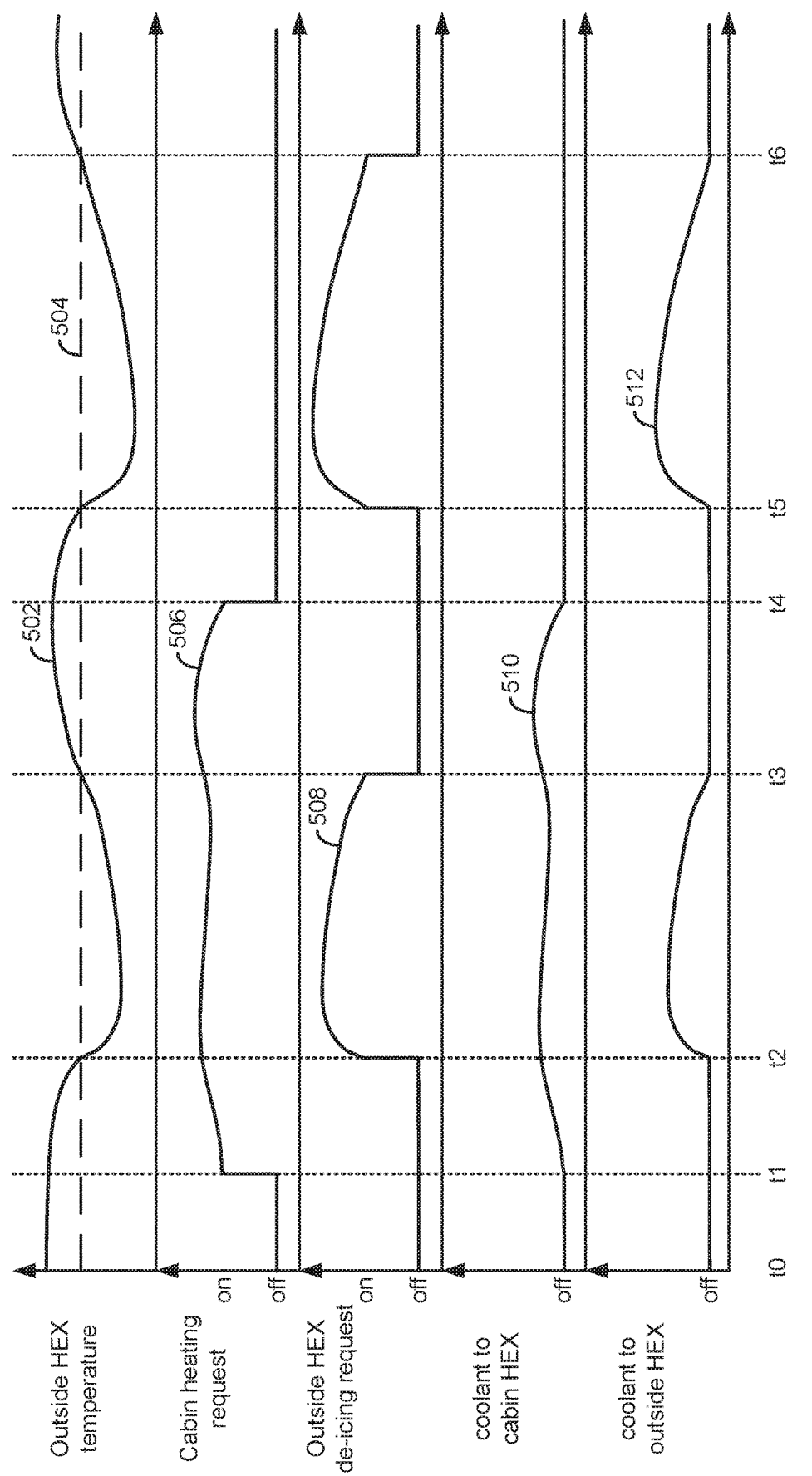
FIG. 5 shows a prophetic example of de-icing an outside heat exchanger while delivering heat to a vehicle cabin according to embodiments of the current disclosure.

Operation of heat pump system 160 may be controlled by controller 190 according to one or more methods stored in non-transitory memory of controller 190, such as those methods described in FIG. 4. In one example, heat exchange system 160 may be operated by controller 190 to transfer waste heat from one or more of the plurality of waste-heat source associated heat exchangers, to both an outside heat exchanger, and a cabin heat exchanger, in response to detection of both a cabin heating request and an outside heat exchanger de-icing request.

The plurality of temperature sensors 164 may provide signals to controller 190, which may enable the controller 190 to determine and/or estimate a temperature of one or more components of the heat pump system 160. For example, a temperature sensor in thermal communication with an outside heat exchanger may provide a temperature signal to controller 190, which may indicate that the outside heat exchanger is below a temperature threshold, heat pump system control module 191 within controller 190 may receive the temperature signal from the temperature sensor (or from controller 190), and may take one or more actions based on the received temperature signal. In one example, based on an outside heat exchanger temperature below a temperature threshold, where in one example the temperature threshold may be the freezing point of water at a current location, heat pump system control module 191 may generate an outside heat exchanger de-icing request, which may include a target rate of heat delivery to be delivered to the outside heat exchanger, and based on the outside heat exchanger de-icing request, controller 190 may transmit a signal to one or more of the plurality of valve actuators 166 to control the flow of coolant through heat pump system 160 according to one or more de-icing methods, such as those discussed in more detail below with reference to FIG. 4.

Turning now to FIG. 2A, a more detailed illustration of heat pump system 160 is shown. FIG. 2A, illustrates an example of heat pump system 160 operating in a cabin heating mode, wherein heat is absorbed by the outside heat exchanger 212 from ambient air, and transferred through heat pump system 160 to cabin heat exchanger 204. Operation of heat pump system 160 in the cabin heating mode shown in FIG. 2A may be in response to detection of a cabin heating request, and further responsive to no detection of an outside heat exchanger de-icing request. Coolant/refrigerant flow-paths are shown as arrows. As shown by legend 242 in the bottom right hand corner of FIGS. 2A and 2B, solid arrows indicate coolant flow, arrows with large dashes indicate no coolant flow (e.g., when flow within a conduit is cut-off by closure/actuation of an upstream valve), and arrows with small dashes indicate refrigerant flow. As an example, numbered components connected by solid arrows indicate flow of coolant between the numbered components, where the coolant flows in the direction indicated by the arrow. In another example, two numbered components connected by arrows with large dashes (or components not connected by arrows) indicate absence of coolant flow between the numbered components. In a third example, numbered components connected by arrows with small dashes indicate refrigerant flow between the numbered components in the direction indicated by the arrow connecting arrows.

A controller, such as controller 190 may control routing/flow of the coolant through heat pump system 160 via actuation of one or more of the valves shown in FIGS. 2A and 2B. Arrows with large dashes downstream of numbered valves may indicate that the degree of opening of the valve substantially prohibits/prevents flow of coolant downstream of the valve (indicated by the arrow with large dashes). Heat pump system 160, as shown in FIGS. 2A and 2B, comprises a dual loop heat pump system, as two separate, fluidically uncoupled, coolant loops are employed to transfer heat from heat sources to heat sinks. In particular, a first coolant loop is employed to transfer heat from a heat source (one or more a waste-heat sources and/or ambient air) to evaporator HEX 210, and a second coolant loop is employed to transfer heat from gas cooler HEX 208 to one or more heat sinks, such as cabin HEX 204 and/or outside HEX 212, wherein evaporator HEX 210 and gas cooler HEX 208 may exchange heat via flow of refrigerant driven by compressor 240.

Heat pump system 160 comprises cabin HEX 204, which may be configured to exchange heat between coolant within heat pump system 160 and air of a vehicle cabin. In some modes, cabin HEX 204 may transfer heat away from air blown into a vehicle cabin, such as in a cabin cooling mode. In other modes, such as that depicted in FIG. 2A, cabin HEX 204 may be configured to receive heated coolant, and transfer heat from the heated coolant into the vehicle cabin in response to a cabin heating request. Cabin HEX 204 may comprise any conventional heat exchanger design, such as any type of fluid-to-air heat exchanger, such as an extended area heat exchanger, a forced air heat exchanger, etc. Cabin HEX 204 may comprise a temperature sensor, such as temperature sensor 234, which may measure and/or infer a temperature of cabin HEX 204. In one example, controller 190 may generate a cabin heating request based upon output of temperature sensor 234 indicating that a cabin temperature is below a temperature threshold, where the threshold may have been selected by a user. Coolant entering cabin HEX 204 (as indicated by the arrow) may be at a higher temperature than coolant exiting cabin HEX 204. Coolant exiting cabin HEX 204 may flow to three way valve 222. As shown in FIG. 2A, three way valve 222 may receive coolant from cabin HEX 204, and may direct received coolant to gas cooler HEX 208. Three way valve 222, as shown in FIG. 2A, prevents flow between itself and three way valve 218.

Gas cooler HEX 208 may comprise a fluid-fluid heat exchanger, such as a liquid-gas HEX, a gas-gas HEX, and/or a liquid-liquid HEX, and may be configured to, in conjunction with evaporator HEX 210, transfer heat from coolant in the second coolant loop to coolant in the first coolant loop. Heated coolant in the second coolant loop (which may have obtained heat from one or more heat sources) may flow through evaporator HEX 210, wherein heat may flow from the heated coolant in the second coolant loop, to refrigerant in evaporator HEX 210. Evaporator HEX 210 may comprise a liquid-liquid, gas-gas, and/or gas-liquid heat exchanger, and may be configured to transfer heat between coolant and refrigerant. Receiving heat from the coolant in the second coolant loop may cause refrigerant within evaporator HEX 210 to evaporate (thus the name evaporator HEX).

The heated refrigerant exiting evaporator HEX 210 may then flow to compressor 240, which may compress and further heat the refrigerant based on a compressor output speed, where the compressor output speed may be controlled by controller 190. Operation of Compressor 240 may both drive flow of refrigerant between evaporator HEX 210 and gas cooler HEX 208, as well as increase the temperature of the refrigerant before the refrigerant flows through gas cooler HEX 208, further increasing a rate of heat transfer between the first and second coolant loops. Compressed refrigerant exiting compressor 240 may then flow through gas cooler HEX 208, giving off heat to coolant in the first coolant loop flowing through the gas cooler HEX 208. As refrigerant flows through gas cooler HEX 208, and gives off heat to coolant in the first coolant loop, the refrigerant (gas) may cool (thus the name gas cooler HEX 208).

Cooled refrigerant exiting gas cooler HEX 208 may then flow to expansion device 241, which may cause refrigerant passing therethrough to expand and cool further. Expansion device 241 may be configured to regulate the amount of refrigerant flowing to the evaporator HEX 210 based on one or more signals received from a controller, which may thereby enable expansion device 241 to control a flowrate of refrigerant to evaporator HEX 210 based on one or more environmental conditions or vehicle operating conditions. In one example, expansion device 241 comprises a thermal expansion valve, which may actively regulate refrigerant flow to evaporator HEX 210 based on input from a controller, and/or based on input from an electrically coupled bulb/thermocouple. The controller and/or bulb may sense or infer current vehicle operating conditions and/or environmental conditions, and may transmit a control signal to expansion device 241 in response to the sensed or inferred vehicle operating conditions and/or environmental conditions based on logic rules stored in non-transitory memory. In one example, measured or inferred vehicle operating conditions may comprise one or more measured or inferred temperatures of one or more heat exchangers/components of heat exchange system 160, and/or measured or inferred temperature of ambient air. In another example, expansion device 241 may comprise a passive capillary tube, which may passively cause refrigerant passing through expansion device 241 to expand and cool, as the refrigerant flows through a capillary constriction of expansion device 241. Refrigerant exiting expansion device 241 may then return to evaporator HEX 210, and the refrigerant cycle may continue.

In this way, a refrigerant loop/heat pump may thermally couple the first coolant loop with the second coolant loop, enabling the first and second coolant loops to efficiently exchange heat. In other words, coolant in the first closed loop may exchange heat with coolant in the second closed loop, via evaporator HEX 210 and gas cooler HEX 208. In one example, relatively cool coolant from a first coolant loop may enter gas cooler HEX 208, while relatively warm coolant from a second coolant loop may enter evaporator HEX 210, and heat from the relatively warm coolant in the second coolant loop may be transferred to the relatively cool coolant in the first coolant loop, via operation of an intermediate refrigerant loop, and in this way, two fluidically uncoupled coolant loops may exchange heat. In the cabin heating mode, depicted in FIG. 2A, relatively cool coolant exiting the cabin HEX 204 may be directed to gas cooler HEX 208 by three way valve 222, wherein the relatively cool coolant may absorb thermal energy before flowing to pump 236.

Pump 236 may produce a pressure differential providing flow to coolant in the first coolant loop. In one example, pump 236 may comprise a positive displacement pump. In another example, pump 236 may comprise a centrifugal pump. Controller 190 may control a speed of pump 236, to control a flowrate of coolant through the first loop. In one example, controller 190 may control a speed of pump 236 via current controlled Pulse Width Modulation (PWM). Coolant exiting pump 236 may then flow to three way valve 228. Three way valve 228 may comprise a three way proportional valve, configured with a single input stream, and two output steams (where a stream may also be referred to as a line, a conduit, and a channel) wherein coolant from the single input stream may be split between the two output streams based on output of controller 190, such as via current PWM. Three way valve 228 may independently adjust coolant flow in the two output streams by controlling a degree of opening/adjusting a cross sectional area in the output streams. In the configuration of heat pump system 160 shown in FIG. 2A, three way valve 228 may direct the flow of coolant back to cabin HEX 204, while preventing coolant flow between three way valve 228 and three way valve 226. The above description discusses each element of heat pump system 160 which may be encountered by coolant during one circuit of the first coolant loop in the cabin heating mode. Coolant circulating in the first coolant loop of heat pump system 160, as shown in FIG. 2A, may thereby transfer heat from the gas cooler HEX 208, to cabin HEX 204.

Turning now to the second loop of the dual loop heat pump system 160 in the cabin heating mode, coolant exiting evaporator HEX 210, which has given up some of its heat to coolant in the first coolant loop (via the closed refrigerant loop), is directed/routed towards outside HEX 212 by three valve 224, and three way valve 226. In particular, in the example shown in FIG. 2A, three way valve 224 prevents coolant in the second coolant loop from flowing to waste-heat HEX array 206, while heat pump system 160 is in a cabin heating mode. In an alternative example, heat pump system 160 may flow coolant to both outside HEX 212 and waste-heat HEX array 206 in parallel during a cabin heating mode, thereby enabling heat to be extracted from both the outside HEX 212 and the waste-heat HEX array 206. In yet another example, three way valve 224 may direct coolant in the second coolant loop towards the waste-heat HEX array while preventing flow of coolant in the second coolant loop to the outside HEX 212, thereby providing cabin heat entirely from waste-heat sources.

Coolant flowing into outside HEX 212 may absorb heat and increase in temperature as it passes through outside HEX 212, which may subsequently decrease a temperature of ambient air in contact with outside HEX 212, which in some conditions may result in condensation of water onto an outside surface of the outside HEX 212 from the ambient air. Water vapor condensed in this manner may freeze on the outside surface of outside HEX 212 if the temperature of outside HEX 212 is below a local freezing point of water. Outside HEX 212 may comprise a temperature sensor 230, which in some examples, may transmit an output (which may comprise a current and/or voltage), indicating a measured temperature, to controller 190, wherein controller 190 may then generate an outside heat exchanger de-icing request based upon the measured temperature being lower than a threshold temperature. Outside HEX 212 may comprise any type of gas-liquid or gas-gas heat exchanger. In one example, outside HEX 212 may comprise a radiator. In another example, outside HEX 212 may comprise more than one temperature sensor, and a rate of heat transfer between coolant flowing through the outside HEX 212 and ambient air may be determined by a controller based on a difference in temperature of the coolant between the first and second (or more) temperature sensors. Responsive to a determination of a rate of heat transfer within the outside HEX 212 below a threshold rate of heat transfer, such as by use of the method of the previous example, controller 190 may generate an outside heat exchanger de-icing request.

After flowing through outside HEX 212, coolant in the second loop may be directed to pump 238 by three way valve 218 and three way valve 220. Three way valve 218 may prevent flow of coolant between itself and three way valve 222, and three way valve 220 may prevent flow of coolant in the second loop to waste-heat HEX array 206. Pump 238 may comprise a positive displacement pump, such as a centrifugal pump. In another example, pump 238 may comprise any conventional pump known in the art of heat pump systems. Pump 238 may drive coolant flow in the second coolant loop by providing/generating a pressure differential between the input (upstream side) and output (downstream side) of pump 238. The coolant exiting pump 238 may then enter evaporator HEX 210, wherein the coolant of the second loop may lose heat to coolant in the first loop via the refrigerant loop. As shown in the example of the cabin heating mode of FIG. 2A, the waste-heat HEX array 206 does not receive a flow of coolant (indicated by the large dashed arrows leading to and away from the waste-heat HEX array 206).

In this manner, dual loop heat pump system 160 may employ a first and second coolant loop to transfer heat from ambient air, through an outside heat exchanger, to a vehicle cabin through a cabin heat exchanger. As previously discussed, heat pump system operation in a cabin heating mode, such as that illustrated in FIG. 2A, may, in some conditions, produce ice fouling on an external surface of the outside HEX 212. A controller, such as controller 190, may detect the ice fouling condition based on one or more sensor readings/outputs, such as described above, which may include a measured or inferred temperature of the outside HEX 212 decreasing to below a threshold temperature, where the threshold temperature is based on a local freezing point of water, or based on a rate of heat transfer between ambient air and the outside HEX 212 decreasing to below a heat transfer threshold, where the heat transfer threshold may be an empirically determined rate of heat transfer of an outside heat exchanger in non-ice-fouled conditions, stored in non-transitory memory of the vehicle controller. Based on detection of the ice fouling condition, a controller may generate an outside heat exchanger de-icing request. Likewise, based upon detection of an ice fouling condition, and further based upon determination that a vehicle cabin is below a threshold temperature, a controller may generated both an outside heat exchanger de-icing request, and a cabin heating request. Upon detection of both an outside heat exchanger de-icing request and a cabin heating request, the controller may actuate the valves of the heat pump system 160 to transition the heat pump system 160 into an outside heat exchanger de-icing mode, which may continue to provide heat to a vehicle cabin, while de-icing an outside heat exchange. FIG. 2B shows heat pump system 160 configured in an outside heat exchanger de-icing mode.

Continuing to FIG. 2B, dual loop heat pump system 160 is shown in an outside heat exchanger de-icing mode. Transition between the cabin heating mode depicted in FIG. 2A and the outside heat exchanger de-icing mode of FIG. 2B may be accomplished by controller induced actuation of three way valve 218, three way valve 220, three way valve 222, three way valve 224, three way valve 226, and three way valve 228, to alter the flow of coolant in the first and second coolant loops. Elements previously discussed above, with reference to FIG. 2A, and FIG. 1, may retain the same numbering in FIG. 2B.

Starting with the first coolant loop at cabin HEX 204, coolant flows through cabin HEX 204 and exchanges heat with air of a vehicle cabin, similar to the cabin heating mode of FIG. 2A. While heat pump system 160 is operating to provide heat to a vehicle cabin, coolant exiting cabin HEX 204 may be at a lower temperature than coolant entering cabin HEX 204. Upon exiting cabin HEX 204 coolant within the first loop may be directed to gas cooler 208 by three way valve 222. However, unlike in the cabin heating mode depicted in FIG. 2A, three way valve 222 enables flow of coolant from outside HEX 212 to merge with coolant exiting cabin HEX 204. In other words, three way valve 222 may be configured as a 2-in-1-out valve, which takes two input streams and produces a single output stream. The combined coolant from the outside HEX 212 and the cabin HEX 204 flow through three way valve 222 and into gas cooler HEX 208, wherein heat is transferred into the coolant of the first coolant loop from the coolant of the second coolant loop via a refrigerant loop comprising compressor 240 and expansion device 241, as discussed above with reference to FIG. 2A.

After exiting gas cooler HEX 208, coolant of the first coolant loop enters into pump 238. Pump 238 may propel coolant through the first coolant loop in response to a command/signal from controller 190. In one example, controller 190 may control an output speed of pump 238 by transmitting a current PWM signal to pump 238. After exiting pump 238, the coolant flows to three way valve 228. In the outside heat exchanger de-icing mode, three way valve 228 may be configured to split the flow of coolant in the first coolant loop into a first amount/portion directed towards the cabin HEX 204, and a second portion/amount directed towards the outside HEX, to deliver heat to both the cabin HEX 204 and the outside HEX 212. In other words, three way valve 228 may be configured as a splitter valve in an outside heat exchanger de-icing mode. Said another way, three way valve 228 may be configured as a 1-in-2-out valve, which takes a single input stream and produces two output streams. Three way valve 228 may adjust coolant flowrate through one or more of the output streams based in response to signals received from controller 190. In one example, controller 190 may control three way valve 228 via PWM. Three way valve 228 may be further configured to independently control the flowrate of the first and second portions of exiting coolant, thereby controlling a rate of heat delivery to the cabin HEX 204 and the outside HEX 212, which lie downstream of three way valve 228. In one example, a first cross sectional flow area of valve 228 leading to cabin HEX 204, and a second cross sectional flow area of valve 228 leading to the outside HEX 212, may be continuously variable/actuable between a fully closed position, and a fully open position, and may further be continuously variably controlled independently of one another, such that the first cross sectional flow area may have a first value, while the second cross sectional flow area has a second value, where the first and second values may be the same, or different. In this way, heat pump system 160 may enable a controller to determine a first portion of heated coolant to allocate to heating a vehicle cabin, and a second portion of coolant to allocate to heating/de-icing an outside heat exchanger.

In one example, the ratio of the first portion of coolant to the second portion of coolant may be based on the cabin heating request and the outside heat exchanger de-icing request. In a more specific example, a ratio of the first coolant portion to the second coolant portion may be proportional to a ratio of a target rate of cabin heat delivery to a target rate of outside heat exchanger heat delivery. In another example, responsive to a determination by the controller that there is insufficient waste-heat to satisfy both a cabin heating request and an outside heat exchanger de-icing request, a vehicle controller may prioritize a cabin heating request responsive to the cabin temperature being more than a threshold below a temperature setpoint of the cabin. In an alternative example, responsive to a determination by the controller that there is insufficient waste-heat available to satisfy both a cabin heating request and an outside heat exchanger de-icing request, a de-icing request may be prioritized responsive to a controller determination that an extent of ice-fouling is greater than a threshold extent of ice fouling, and/or that a rate of heat transfer between ambient air and the outside heat exchanger has decreased below a threshold. As used above, prioritizing a heating request indicates allocating available waste heat to satisfy said heating request first, before allocating remaining heat to other heating requests. In such cases, a first, prioritized heating request may be satisfied, while one or more additional heating requests may be partially satisfied, wherein satisfaction of a heating request may comprises achieving a target rate of heat delivery, and/or providing a total predetermined amount of heat to the one or more vehicle components corresponding to the heating request.

Thus, coolant exiting three way valve 228 flows in parallel to both the outside HEX 212 and the cabin HEX 204. The coolant may then transfer heat to both the cabin HEX 204 and the outside HEX 212, proportional to the first coolant portion and the second coolant portion respectively. The first and second coolant portions may then exit the cabin HEX 204 and the outside HEX 212, respectively, before merging at three way valve 222. Three way valve 226 and three way valve 228, as shown in FIG. 2B, have been actuated to prevent coolant flow to three way valve 224 and three way valve 220, respectively. In other words, three way valves 226 and three way valve 228 be actuated by controller 190 to act as 1-in-1-out valves, which take a single input stream and produce a single output stream.

Turning now to the second coolant loop of heat pump system 160 in an outside heat exchanger de-icing mode, coolant exiting evaporator HEX 210 flows to first to three way valve 224. Three way valve 224 may be configured to act as a 1-in-1-out valve, which takes a single input stream and produces a single output stream. Specifically, three way valve 224 may prevent flow of coolant in the second loop from flowing from three way valve 224 to three way valve 226. Coolant exiting evaporator HEX 210 is directed/routed by three way valve 224 to waste-heat HEX array 206.

At waste-heat HEX array 206, coolant flows through one or more waste-heat HEXs, which may be thermally coupled to one or more waste-heat sources, as will be discussed in more detail below, with reference to FIG. 3. As coolant passes through waste-heat HEX array 206, heat is transferred from waste-heat sources to coolant. The heated coolant, upon exiting waste-heat HEX 206, flows to pump 238, via three way valve 220. Three way valve 220 is configured to act as a 1-in-1-out valve, which takes one input stream and produces one output stream. Three way valve 220 prevents coolant in the second coolant loop from flowing to three way valve 218. Three way valve 220 directs heated coolant in the second loop to pump 238. Pump 238 provides the pressure differential driving coolant flow in the second coolant loop, and the speed of pump 238 may be controlled by controller 190, thereby enabling controller 190 to adjust/control a rate of coolant flow through the second coolant loop. Coolant exiting pump 238 proceeds to flow into evaporator HEX 210, wherein the coolant in the second coolant loop transfers heat to refrigerant flowing from evaporator HEX 210 to gas cooler HEX 208 via operation of compressor 240. In this way, coolant in the second coolant loop may transfer heat to coolant in the first coolant loop. In this way, a dual loop heat pump system, such as heat pump system 160, may transfer heat from a plurality of waste-heat sources, to a cabin heat exchanger and an outside heat exchanger, enabling a cabin heating request to be satisfied while providing heat to an outside heat exchanger to remove accumulated ice/condensation.

Turning to FIG. 3, a more detailed illustration of example waste-heat HEX array 206 is shown. Waste-heat HEX array 206 is one example of an array of waste-heat HEXs, which may be utilized to extract waste-heat generated from one or more waste-heat sources, for transfer to other regions of a vehicle, via a heat pump system such as that discussed above. Although waste-heat HEX array 206 comprises a parallel array of a plurality of waste-heat HEXs, it will be appreciated that the current disclosure also provides for one or more waste-heat heat exchangers arranged in series, that is, with the inlet of one HEX downstream of the outlet of another HEX. Additionally, the current disclosure may provide for an array of waste-heat heat exchangers arranged in both parallel and in series, such that a first subset of the plurality of waste-heat heat exchangers are arranged in parallel, while a second subset may be arranged in series. Elements of FIG. 3 previously introduced and discussed above with reference to FIGS. 2A, and 2B may retain the same numbering as given above. As discussed in FIG. 2B, heat exchange fluid may flow from three way valve 224, through waste-heat HEX array 206, before exiting the waste-heat HEX array and passing continuing on to three way valve 220 before entering evaporator HEX 210. Heat exchange fluid (which may comprise coolant, refrigerant, or other fluids capable of transferring heat) may pass through waste-heat HEX array 206 to absorb heat, which may then be transferred to other vehicle components, such as a cabin heat exchanger and an outside heat exchanger.

Waste-heat HEX array 206 comprises motor HEX 302, inverter HEX 304, alternator HEX 306, transmission HEX 308, and battery HEX 310. As the heat exchange fluid passes through the waste-heat HEXs, its temperature increases as it absorbs thermal energy. The amount of heat transferred from the waste-heat sources to the heat exchange fluid depends on the rate of heat exchange fluid flow, and the difference in temperature between the heat exchange fluid and the waste-heat source temperature, with higher flowrates and greater temperature differences corresponding to higher rates of heat transfer for a given heat exchanger. Heat exchange fluid flow through each waste-heat HEX may be controlled by operation of pump 216 (as discussed above), in conjunction with a valve position of one or more of valve 312, valve 314, valve 316, valve 318, and valve 320 associated with each waste-heat heat exchanger. Each of the previously listed valves may be located upstream of the heat exchanger for which it regulates heat exchange fluid flow, actuating the valve may change the cross sectional area of flow through the region of the valve, thereby increasing or decreasing the downstream flow proportional to this cross sectional area. In one example, one or more of valves 312-320 may be an on/off valve, such that flow may be controlled by pump 216, and valves 312-320 may control in a binary fashion if fluid flow through the associated waste-heat HEX is enabled or not. In another example, one or more of valves 312-320 may comprise continuously adjustable valves, such that flow through the associated waste-heat heat exchanger may be continuously adjustable between a range bounded by a maximum and minimum value, where the maximum value is greater than zero, and the minimum value may be zero or may be greater than zero. In particular, valve 312 may comprise either an on off valve or a continuously adjustable valve, and may be associated with a valve actuator (not shown), wherein the valve actuator may actuate/adjust a position/degree of opening of valve 312, thereby controlling an amount/rate of heat exchanger fluid flow through motor HEX 302 which resides downstream of valve 312. In likewise, valve 314 may comprise either an on off valve or a continuously adjustable valve, and may be associated with a valve actuator (not shown), wherein the valve actuator may actuate/adjust a position/degree of opening of valve 314, thereby controlling an amount/rate of heat exchanger fluid flow through inverter HEX 304 which resides downstream of valve 314. In another example valve 316 may comprise either an on off valve or a continuously adjustable valve, and may be associated with a valve actuator (not shown), wherein the valve actuator may actuate/adjust a position/degree of opening of valve 316, thereby controlling an amount/rate of heat exchanger fluid flow through alternator HEX 306 which resides downstream of valve 316. In another example, valve 318 may comprise either an on off valve or a continuously adjustable valve, and may be associated with a valve actuator (not shown), wherein the valve actuator may actuate/adjust a position/degree of opening of valve 318, thereby controlling an amount/rate of heat exchanger fluid flow through transmission HEX 308 which resides downstream of valve 318. In another example, valve 320 may comprise either an on off valve or a continuously adjustable valve, and may be associated with a valve actuator (not shown), wherein the valve actuator may actuate/adjust a position/degree of opening of valve 320, thereby controlling an amount/rate of heat exchanger fluid flow through battery HEX 310 which resides downstream of valve 320.

In one example, a vehicle controller, such as controller 190, may actuate a valve controlling flow to a waste heat source heat exchanger to disable flow of heat exchange fluid through said HEX based upon an estimated temperature of the associated waste heat source being lower than a temperature threshold. The temperature threshold may be based upon an estimated or inferred cabin temperature and an estimated or inferred outside heat exchanger temperature. Estimation of waste-heat heat exchanger temperatures may be based on vehicle operating conditions, such as duration of vehicle operation, the current route, motor output, ambient conditions such as temperature, weather, and humidity, or it may be inferred based on readings from one or more temperature sensors associated with, or in the proximity of, the relevant heat exchanger, such as temperature sensor 322, temperature sensor 324, temperature sensor 326, temperature sensor 328, and temperature sensor 330. In one example, one or more of temperature sensors 322-330 may comprise a thermocouple, in direct contact (thermally coupled) with one or more of the waste-heat heat exchangers in waste-heat HEX array 206.

In another example, controller 190 may transmit a command signal to a valve actuator associated with a valve shown in FIG. 3, to actuate the valve associated with a waste-heat source heat exchanger to increase the flow of heat exchange fluid through said heat exchanger based upon an estimated rate of waste heat generation, such that waste heat sources generating more heat in a given amount of time may have an increased flow through their associated waste-heat heat exchanger. Under some conditions it may be beneficial to bypass all waste-heat heat exchangers, such as when all waste heat sources are below a threshold temperature. Bypass valve 322 may enable bypass of every waste-heat heat exchanger under such conditions, by enabling heat exchange fluid to flow directly from three way valve 224 to three way valve 220 without passing through any of waste-heat HEXs 302, 304, 306, 308, and 310. In a specific example, by closing valve 312, valve 314, valve 316, valve 318 and valve 320, and opening bypass valve 322, heat exchange fluid may bypass every waste-heat HEX in waste-heat HEX array 206.

Turning to FIG. 4, example method 400 is shown. Method 400 provides one example method for operating a dual loop heat exchanger in a de-icing mode, while providing heat to a vehicle cabin. Method 400 comprises, responsive to both a generated cabin heating request and outside heat exchanger de-icing request, evaluating temperatures at a plurality of waste-heat sources, selecting one or more waste-heat heat exchangers based on the evaluated temperatures of the one or more waste-heat heat exchangers exceeding a temperature threshold, and transferring heat in parallel to both a cabin heat exchanger and the outside heat exchanger from the selected waste-heat heat exchangers, where the amount of heat transferred to the cabin heat exchanger is determined based on the cabin heating request, and the amount of heat transferred to the outside heat exchanger is determined based on the outside heat exchanger de-icing request. This may enable a vehicle heat pump system to de-ice an outside heat exchanger while providing a target rate of heat delivery to a vehicle cabin by utilizing available waste heat, which may reduce the probability of an outside heat exchanger being fouled by ice, while also reducing reliance on heating components/methods which may drain a vehicle battery or put excess strain on vehicle components. Instructions for carrying out method 400 may be executed by a controller based on instructions stored on a memory of the controller and in conjunction with signals received from sensors of the heat pump system, such as the sensors described above with reference to FIGS. 1, 2A, 2B, and 3. The controller may employ actuators of the heat pump system to adjust heat pump system operation, according to the method described below.

Method 400 begins as 402, which may include estimating and/or measuring vehicle operating conditions. Vehicle operating conditions may include one or more of vehicle speed, vehicle location, duration of cabin heating during current drive cycle, temperature of one or more vehicle components (engine, motor, heat exchangers etc.), various motor conditions, such as motor status (on or off), motor temperature, motor torque, motor speed, etc., various engine conditions, such as engine status (on or off), engine speed, engine temperature, time since previous engine shutdown, time since previous engine start, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc., various battery conditions, such as a current battery state of charge, current battery temperature, etc. Once vehicle operating conditions are determined/estimated, method 400 may proceed to 403.

At 403, method 400 includes, measuring or inferring ambient conditions. Ambient conditions may include the temperature of the ambient air, the prevailing barometric pressure, the prevailing humidity, wind and weather conditions, etc. Ambient conditions may be measured or inferred by the vehicle controller based on output from one or more vehicle sensors. In one example, the air temperature may be estimated based on output from one or more vehicle temperature sensors. In another example, the barometric pressure may be measured or inferred based on output from one or more vehicle pressure sensors, such as an intake manifold pressure sensor. In another example, ambient humidity may be measured of inferred based on output from one or more vehicle humidity sensors. In yet another example, ambient conditions may be obtained via connection to a wireless network, which may include access to a navigation/weather system. Once ambient conditions have been estimated/measured, method 400 may then proceed to 404.

At 404, method 400 may include determining if a cabin heating request has been detected. In one example, a cabin heating request may comprise a pre-determined value stored in a pre-specified location within memory of a controller, where, upon update of the value stored within the pre-specified location, the controller may determine if a cabin heating request has been generated. As a more specific example, a Boolean variable may indicate that a cabin heating request has been generated when the value stored in the variable is non-zero, and conversely, when the value stored within the Boolean variable is zero, this may indicate that a heating request has not been generated. In another example, a heating request may comprise a signal transmitted to a vehicle controller from one or more vehicle components. As a more specific example, a cabin temperature sensor, responsive to a measured or inferred cabin temperature below a temperature threshold, may transmit an electronic signal to the controller, wherein the signal is a cabin heating request. In another example, a cabin heating request may be generated responsive to an operator selection of a climate control setting. In another example, a cabin heating request may be automatically generated by a vehicle controller responsive to a measured or inferred cabin temperature decreasing to below a pre-determined cabin temperature threshold, where the temperature threshold may be set by a vehicle operator using a dial, touchscreen, slider, or voice commands. A cabin heating request may comprise a target rate of cabin heat delivery, and/or a target cabin temperature. In one example, a cabin heating request may comprise a number of kilojoules of heat energy to transport to a vehicle cabin per minute. If at 404, it is determined that no cabin heating request has been detected, method 400 may proceed to 406, whereat current heat pump system operation may be maintained, and method 400 may then end. However, if at 404 it is determined that a cabin heating request has been detected, method 400 may proceed to 408.

At 408, method 400 may include determining if an outside heat exchanger de-icing request has been detected. In one example, an outside heat exchanger de-icing request may comprise a pre-determined value stored in a pre-specified location within memory of a controller. As a more specific example, a Boolean variable may indicate that an outside heat exchanger de-icing request has been generated when the value stored in the variable is non-zero, and conversely, when the value stored within the Boolean variable is zero, this may indicate that an outside heat exchanger de-icing request has not been generated. In another example, an outside heat exchanger de-icing request may comprise a signal transmitted to a vehicle controller from one or more vehicle components. As a more specific example, a temperature sensor coupled to the outside heat exchanger, responsive to a measured or inferred outside heat exchanger temperature below a temperature threshold, may transmit an electronic signal to the controller, wherein the signal is an outside heat exchanger de-icing request. The temperature threshold in the previous example may be further based on a measured or inferred ambient humidity and/or weather conditions determined either via onboard vehicle sensors, or from a computer network such as the Internet. As a more specific example, a vehicle controller may generate an outside heat exchanger de-icing request in response to a determination that, based on ambient temperature and humidity, and further based on an outside heat exchanger temperature, that condensation of water onto the outside heat exchanger is likely, and further, that the temperature of the outside heat exchanger is below a local freezing point (where the local freezing point may be determined by the controller based on elevation, pressure, etc.). In another example, a vehicle controller may determine that an outside heat exchanger is fouled by ice based on an actual rate of heat transfer being less than an expected rate of heat transfer (calculated based on normal, un-ice-fouled outside heat exchanger operation), which may indicate degradation of the heat transfer capacity of the outside heat exchanger based on ice fouling. The method of the previous example may further quantify an extent of ice fouling based on the difference between the expected rate of heat transfer of the outside heat exchanger and the actual rate of heat transfer of the outside heat exchanger as measure/inferred based on temperature sensor data and/or other sensor data, as a correlation between an extent of ice fouling and a degree of heat transfer degradation may be stored within memory of a controller. If no outside heat exchanger de-icing request has been detected, method 400 may proceed to 410, whereat a vehicle heat pump system may be operated to deliver heat to a cabin heat exchanger based on the detected cabin heating request, and method 400 may then end. However, if at 408 an outside heat exchanger de-icing request is detected, method 400 may proceed to 412.

At 412, method 400 may include selecting one or more waste-heat heat exchangers. In one example, step 412 may include selecting a first waste-heat heat exchanger based on a temperature of the first waste-heat heat exchanger exceeding a first temperature threshold. Step 412 may further include selecting one or more additional waste-heat heat exchangers based on a temperature of the one or more additional waste-heat heat exchangers being greater than a waste-heat heat exchanger temperature threshold. In one example, each waste-heat heat exchanger may be selected based on comparison to different a waste-heat heat exchanger temperature threshold, such that distinct heat exchangers may be selected upon surpassing a temperature threshold determined for that specific heat exchanger. The waste-heat heat exchanger temperature threshold may be based on a cabin temperature, an outside heat exchanger temperature etc. using logic rules and/or look-up tables. In one example, the waste-heat heat exchanger temperature threshold may be set/determined using logic rules, such that the waste-heat heat exchanger temperature is set a pre-determined amount above Th, where Th is equal to the cabin heat exchanger temperature, or the outside heat exchanger, whichever is higher. As a more specific example, based on a measured/inferred cabin temperature of 60° F., an outside heat exchanger temperature of 31° F., a waste-heat heat exchanger temperature threshold of 63° F. may be determined, and a waste-heat heat exchanger with a measured/inferred temperature of 68° F. may be selected, thereby ensuring that heat may be transferred from the waste-heat heat exchanger to the cabin heat exchanger and/or the outside heat exchanger. In another example, the waste-heat heat exchanger temperature threshold may be selected individually for each waste-heat source associated with each waste-heat heat exchanger, based on a pre-determined range of efficient operating temperatures. As a more specific example, an operational temperature range for an engine may be 120-180° F., and thus a heat exchanger thermally coupled to an engine at or below 120° F. may not be selected, as the engine temperature may decrease below the lower recommended operating temperature if heat is transferred from the engine to a heat pump system. Once one or more waste-heat heat exchangers have been selected, method 400 may then proceed to 414.

At 414, method 400 may include adjusting heat pump system valves to flow coolant in first coolant loop through selected waste-heat heat exchangers, such as discussed above in more detail with reference to FIG. 3. In one example, adjusting heat pump system valves to flow coolant in first coolant loop through selected waste-heat heat exchangers comprises opening one or more valves upstream of a selected waste-heat heat exchanger. In another example, step 414 of method 400 further comprises adjusting an rate of coolant flow through a waste-heat heat exchanger based on a measured or inferred temperature of the waste-heat heat exchanger by adjusting an extent of valve opening, wherein the valve is upstream of the waste-heat heat exchanger. Once the valve actuations of step 414 have been completed, method 400 may proceed to 416.

At 416, method 400 may include transferring heat from the first coolant loop to the second coolant loop via a refrigerant loop comprising an evaporator HEX and a gas cooler HEX. In one example, transferring heat from the first coolant loop to the second coolant loop comprises flowing coolant from a first coolant loop through an evaporator HEX, and flowing coolant from a second coolant loop through a gas cooler HEX, wherein heat is transferred between the evaporator HEX and gas cooler HEX by refrigerant propelled by a compressor. In one example, a rate of heat transfer between the first and the second coolant loops may be adjusted by the controller by adjusting a flowrate rate of the coolant and/or refrigerant. Method 400 may then proceed to 418.

At 418, method 400 may include determining a first portion of coolant in the second coolant loop to flow through a cabin heat exchanger and a second portion of coolant in the second coolant loop to flow through an outside heat exchanger. In one example, a ratio of the first portion to the second portion may be proportional to the ratio between a target rate of heat delivery to a cabin heat exchanger to a target rate of outside heat exchanger heat delivery, wherein the target rate of cabin heat exchanger heat delivery is based upon a cabin temperature, a cabin temperature climate control setting selected by a user, and wherein the target rate of outside heat exchanger heat delivery is based upon an extent of ice fouling and/or a measured or inferred temperature of the outside heat exchanger. In another example, determining a first portion of coolant in the second coolant loop to flow through a cabin heat exchanger and a second portion of coolant in the second coolant loop to flow through an outside heat exchanger may comprise determining if an available amount of waste-heat is sufficient to satisfy both a cabin heating request and an outside heat exchanger de-icing request, and responsive to a determination by the controller that the total available amount of waste heat is insufficient to satisfy both requests, determining a priority heating request, wherein available waste-heat is allocated to the priority heating request first, and remaining available waste-heat is allocated to additional heating requests second. As an example, a controller may determine that an outside heat exchanger de-icing request is a priority heating request based upon an inferred degree/extent of ice fouling of the outside heat exchanger exceeding a threshold and/or an extent of outside heat exchanger heat transfer rate being reduced to below a threshold heat transfer rate due to ice fouling. Alternatively, a controller may determine that a cabin heating request is a priority heating request based upon a measured or inferred cabin temperature being greater than a threshold below a cabin temperature set point, where the cabin temperature set point may be selected by a vehicle operator. The thresholds for determining priority heating requests may not be equivalent to the thresholds upon which a cabin heating request and/or an outside heat exchanger de-icing request may be generated, as the priority heating request thresholds may be set to more extreme values, indicating greater need for heating. Method 400 may then proceed to 420.

At 420, method 400 may include adjusting heat pump system valves to flow the first portion of coolant through the cabin heat exchanger and the second portion of coolant through the outside heat exchanger. In one example, adjusting heat pump system valves to flow the first portion of coolant through the cabin heat exchanger, and the second portion of coolant through the outside heat exchanger, may comprise adjusting a cross sectional flow area in a first conduit leading to the cabin heat exchanger to a first value, and adjusting a cross sectional flow are in a second conduit, leading to the outside heat exchanger, to a second value, wherein the first value and the second value are based on the first portion and the second portion, respectively. Method 400 may then proceed to 422.

At 422, method 400 may include determining if the outside heat exchanger de-icing request has been satisfied. In one example, a controller may determine that an outside heat exchanger de-icing request has been satisfied based on a measured or inferred temperature of the outside heat exchanger exceeding a pre-determined temperature threshold. In one example, the pre-determined temperature threshold may be the local freezing point of water. In another example, the temperature threshold may be pre-determined amount greater than the local freezing point of water. In yet another example, the temperature threshold may be 33° F. In another example, at 422, determining if the outside heat exchanger de-icing request has been satisfied may comprise determining if a pre-determined duration of heat delivery to the outside heat exchanger has elapsed. In yet another example, determining if the outside heat exchanger de-icing request has been satisfied may comprise determining if a threshold amount of heat has been delivered to the outside heat exchanger, where the threshold amount of heat may be based on the estimated extent of ice fouling/heat transfer degradation of the outside heat exchanger. In another example, determining if the outside heat exchanger de-icing request has been satisfied may comprise determining if a rate of heat transfer between the ambient air and the outside heat exchanger is above a threshold, or within a pre-determined range of nominal heat transfer (such as may be determined using data derived from an outside heat exchanger in a controlled environment, free of ice fouling). If it is determined at 422 that the outside heat exchanger de-icing request has not been satisfied, method 400 may return to 412, and the steps of selecting waste heat sources, and transferring heat to the cabin heat exchanger and outside heat exchanger may continue until the outside heat exchanger de-icing request is satisfied. However, if at 422 it is determined that the outside heat exchanger de-icing request has been satisfied, method 400 may end.

FIG. 5 depicts an example timeline 500 for de-icing an outside heat exchanger while maintaining heat delivery to a vehicle cabin, using the method described herein and with regard to FIG. 4 as applied to the system described herein and with regard to FIGS. 1, 2A, 2B, and 3. Timeline 500 includes plot 502, indicating a temperature of the outside heat exchanger over time. Plot 502 includes threshold temperature 504, which indicates a temperature below which an outside heat exchanger may accumulate frost/ice based on current estimated/inferred ambient conditions. Timeline 500 further includes plot 506, indicating a cabin heating request/target rate of cabin heat delivery over time. Timeline 500 further includes plot 508, indicating an outside heat exchanger de-icing request/a target rate of outside heat exchanger heat delivery, over time. Timeline 500 further includes plot 510, indicating an amount of coolant flowing through a cabin heat exchanger, such as cabin HEX 204, as a function of time. Finally, timeline 500 includes plot 512, indicating an amount of coolant flowing through an outside heat exchanger, such as outside HEX 212, as a function of time.

At time to, the temperature of the outside heat exchanger is above the threshold temperature 504, and accordingly, no outside heat exchanger de-icing request has been generated. Further, at to, no cabin heating request has been generated, and as no cabin heating request, and no outside heat exchanger de-icing requests have been generated, no coolant is flowing through the cabin heat exchanger or outside heat exchanger.

Between $t_0$ and $t_1$, the outside heat exchanger temperature decreases slightly. At $t_1$, a cabin heating request is generated, and coolant begins to flow to the cabin heat exchanger to provide satisfy the cabin heating request. Between $t_1$ and $t_2$, the cabin heating request/target rate of cabin heat delivery increases, and the amount of coolant flowing through the cabin heat exchanger increases proportionally.

At $t_2$, the outside heat exchanger temperature deceases below threshold temperature 504, and in response, an outside heat exchanger de-icing request is generated, and coolant begins to flow to the outside heat exchanger based on the outside heat exchanger de-icing request. Between $t_2$ and $t_3$, coolant continues flowing through the outside heat exchanger in response to the outside heat exchanger de-icing request, while the temperature of the outside heat exchanger begins to increase, and cabin heating is maintained by flowing coolant through the cabin heat exchanger. As the temperature of the outside heat exchanger increases, the target rate of outside heat exchanger heat delivery decreases, and the amount of coolant flowing through the outside heat exchanger decreases.

At $t_3$, the temperature of the outside heat exchanger has increased above threshold temperature 504, and as such, the outside heat exchanger de-icing request is satisfied, and coolant ceases flowing through the outside heat exchanger. Between $t_3$ and $t_4$, the cabin heating request/target rate of cabin heat delivery decreases, while the flow of coolant through the cabin heat exchanger also decreases based on the decreasing cabin heating request.

At $t_4$, the cabin heating request is satisfied, and the flow of coolant through the cabin heat exchanger is discontinued. Between $t_4$ and $t_5$, the temperature of the outside heat exchanger decreases.

At $t_5$, the temperature of the outside heat exchanger again decreases below the threshold temperature 504, which may indicate ice fouling, and accordingly, an outside heat exchanger de-icing request is generated, and a flow of coolant through the outside heat exchanger is initiated in response to the generated outside heat exchanger de-icing request. Between $t_5$ and $t_6$, the temperature of the outside heat exchanger increases as heat is transferred to the outside heat exchanger through the flowing coolant. At $t_6$, the temperature of the outside heat exchanger has increased above threshold temperature 504, indicating satisfaction of the outside heat exchanger de-icing request, and in response, flow of coolant through the outside heat exchanger is discontinued, and timeline 500 ends.

In this way, a dual loop heat pump system may de-ice an outside heat exchanger, while maintaining heat delivery to a vehicle cabin, without consuming additional energy to provide heat. This may mitigate issues associated with previous approaches for de-icing outside heat exchangers, which relied upon generation of heat by increasing an output speed of a compressor, employing electric resistive heaters, or other energy inefficient methods, or which relied on ceasing heat delivery to a vehicle cabin all together. The inventors herein have discovered advantageous strategies for using waste-heat, produced by one or more vehicle components, to efficiently provide heat for both cabin heating and outside heat exchanger de-icing, by flowing coolant through one or more waste-heat HEXs having a greater than threshold temperature, and allotting the heat derived from the waste-heat HEXs between a vehicle cabin, and an outside heat exchanger, based on the relative heating demands of each.

The technical effect of flowing a first portion of coolant exiting a first waste-heat heat exchanger to a cabin heat exchanger and flowing a second portion of the coolant exiting the first waste-heat heat exchanger to an outside heat exchanger in response to a generated cabin heating request and a generated outside heat exchanger de-icing request, is that a finite amount of available waste-heat may be efficiently apportioned between a cabin heat exchanger and an outside heat exchanger, thereby enabling cabin heat delivery to be maintained while de-icing an outside heat exchanger.

The disclosure also provides support for a method comprising: generating an outside heat exchanger de-icing request; generating a cabin heating request; responsive to the outside heat exchanger de-icing request and the cabin heating request: selecting a first waste-heat heat exchanger based on a temperature of the first waste-heat heat exchanger exceeding a first temperature threshold; flowing coolant to the first waste-heat heat exchanger; flowing a first portion of the coolant exiting the first waste-heat heat exchanger to a cabin heat exchanger; and flowing a second portion of the coolant exiting the first waste-heat heat exchanger to an outside heat exchanger. In a first example of the method, wherein a ratio of the first portion to the second portion is based on the cabin heating request and the outside heat exchanger de-icing request. In a second example of the method, optionally including the first example, wherein the cabin heating request comprises a target rate of cabin heat delivery, and wherein the outside heat exchanger de-icing request comprises a target rate of outside heat exchanger heat delivery. In a third example of the method, optionally including the first and second examples, wherein the ratio of the first portion to the second portion is proportional to a ratio between the target rate of cabin heat delivery and the target rate of outside heat exchanger heat delivery. In a fourth example of the method, optionally including the first through third examples, wherein generating the outside heat exchanger heating request is responsive to an indication that the outside heat exchanger is fouled with ice. In a fifth example of the method, optionally including the first through fourth examples, wherein the indication that the outside heat exchanger is fouled with ice comprises a determination that a rate of heat transfer between ambient air and the outside heat exchanger is below a threshold rate of heat transfer. In a sixth example of the method, optionally including the first through fifth examples, wherein the indication that the outside heat exchanger is fouled with ice is in response to a determination that a temperature of the outside heat exchanger is below a second threshold temperature. In a seventh example of the method, optionally including the first through sixth examples, the method further comprising: flowing coolant to a second waste-heat heat exchanger based on a temperature of the second waste-heat heat exchanger exceeding a second threshold temperature. In an eighth example of the method, optionally including the first through seventh examples, the method further comprising: ceasing flowing coolant to the first waste-heat heat exchanger based on the temperature of the first waste-heat heat exchanger decreasing below the first threshold temperature.

The disclosure also provides support for a method comprising: determining a first target rate of heat delivery to a vehicle cabin; determining a second target rate of heat delivery to an outside heat exchanger; selecting one or more waste-heat heat exchangers from a plurality of waste-heat exchangers; routing a first coolant in a first coolant loop to the selected one or more waste-heat heat exchangers; routing a first portion of a second coolant in a second coolant loop to the vehicle cabin; and routing a second portion of the second coolant in the second coolant loop to the outside heat exchanger, wherein a ratio of the first portion and the second portion is based on the first target rate of heat delivery and the second target rate of heat delivery. In a first example of the method, wherein the first coolant loop and the second coolant loop are not fluidically coupled. In a second example of the method, optionally including the first example, wherein the first coolant loop and the second coolant loop are thermally coupled via a gas cooler heat exchanger and a evaporator heat exchanger. In a third example of the method, optionally including the first and second examples, wherein selecting one or more waste-heat heat exchangers from the plurality of waste-heat exchangers comprises selecting a first waste-heat heat exchanger having a temperature which exceeds a first temperature threshold, wherein the first temperature threshold is based on a temperature of the vehicle cabin and/or a temperature of the outside heat exchanger. In a fourth example of the method, optionally including the first through third examples, wherein routing the first portion of the second coolant in the second coolant loop to the vehicle cabin and routing the second portion of the second coolant in the second coolant loop to the outside heat exchanger comprises splitting a flow of the second coolant into the first portion and the second portion via a three-way valve. In a fifth example of the method, optionally including the first through fourth examples, wherein routing the first portion of the second coolant in the second coolant loop to the vehicle cabin and routing the second portion of the second coolant in the second coolant loop to the outside heat exchanger comprises flowing the first portion to the vehicle cabin and flowing the second portion to the outside heat exchanger in parallel.

The disclosure also provides support for a vehicle heat exchange system comprising: a first coolant loop comprising: a first pump; and a plurality of waste-heat heat exchangers; a second coolant loop comprising: a second pump; a cabin heat exchanger; and an outside heat exchanger; a refrigerant loop thermally coupling the first coolant loop with the second coolant loop; and a controller configured with instructions stored in non-transitory memory that when executed cause the controller to: generate an outside heat exchanger de-icing request; generate a cabin heating request; responsive to the outside heat exchanger de-icing request and the cabin heating request: pump coolant in the first coolant loop through one or more of the plurality of waste-heat heat exchangers via the first pump; transfer heat from the first coolant loop to the second coolant loop via the refrigerant loop; pump in parallel a first fraction of coolant in the second coolant loop to the cabin heat exchanger and a second fraction of coolant in the second coolant loop to the outside heat exchanger via the second pump. In a first example of the system, wherein the outside heat exchanger de-icing request is generated responsive to an indication that the outside heat exchanger is fouled by ice. In a second example of the system, optionally including the first example, wherein a ratio of the first fraction of coolant to the second fraction of coolant is based on an outside heat exchanger temperature and a cabin temperature. In a third example of the system, optionally including the first and second examples, wherein the cabin heating request is generated based on an operator climate control selection. In a fourth example of the system, optionally including the first through third examples, wherein a three-way valve splits a flow of coolant in the second coolant loop into the first fraction of coolant and the second fraction of coolant.

In another representation, the heat pump system may further comprise a heat reservoir, which may comprise a phase changing material having a high enthalpy of transition between liquid and solid, and/or between liquid and gas. The heat reservoir may store heat generated by one or more waste heat sources for future use. The heat reservoir may have an associated heat exchanger, which may be configured to facilitate heat transfer between coolant and/or refrigerant of the heat pump system with the phase change material within the heat reservoir.

In another representation, a method for a hybrid vehicle comprising: generating an outside heat exchanger de-icing request; generating a cabin heating request; responsive to the outside heat exchanger de-icing request and the cabin heating request: selecting a first waste-heat heat exchanger based on a temperature of the first waste-heat heat exchanger exceeding a first temperature threshold; flowing coolant to the first waste-heat heat exchanger, wherein the waste-heat heat exchanger is thermally coupled to one or more electronic waste heat sources of the hybrid vehicle; flowing a first portion of the coolant exiting the first waste-heat heat exchanger to a cabin heat exchanger; and flowing a second portion of the coolant exiting the first waste-heat heat exchanger to an outside heat exchanger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
  determining a first target rate of heat delivery to a vehicle cabin;
  determining a second target rate of heat delivery to an outside heat exchanger;
  selecting one or more waste-heat heat exchangers from a plurality of waste-heat exchangers;
  routing a first coolant in a first coolant loop to the selected one or more waste-heat heat exchangers;
  routing a first portion of a second coolant in a second coolant loop to the vehicle cabin; and
  routing a second portion of the second coolant in the second coolant loop to the outside heat exchanger, wherein a ratio of the first portion and the second portion is based on the first target rate of heat delivery and the second target rate of heat delivery,
  wherein selecting one or more waste-heat heat exchangers from the plurality of waste-heat heat exchangers comprises selecting a first waste-heat heat exchanger having a temperature which exceeds a first temperature threshold, wherein the first temperature threshold is based on a temperature of the vehicle cabin and/or a temperature of the outside heat exchanger.

2. The method of claim 1, wherein the first coolant loop and the second coolant loop are not fluidically coupled.

3. The method of claim 2, wherein the first coolant loop and the second coolant loop are thermally coupled by a refrigerant loop comprising a gas cooler heat exchanger and an evaporator heat exchanger.

4. The method of claim 1, wherein routing the first portion of the second coolant in the second coolant loop to the vehicle cabin and routing the second portion of the second coolant in the second coolant loop to the outside heat exchanger comprises splitting a flow of the second coolant into the first portion and the second portion via a three-way valve.

5. The method of claim 1, wherein routing the first portion of the second coolant in the second coolant loop to the vehicle cabin and routing the second portion of the second coolant in the second coolant loop to the outside heat exchanger comprises flowing the first portion to the vehicle cabin and flowing the second portion to the outside heat exchanger in parallel.

* * * * *